Dec. 14, 1954 J. W. GRATIAN 2,697,135

MAGNETIC RECORDING HEAD

Filed Jan. 11, 1954 2 Sheets-Sheet 1

INVENTOR.
JOSEPH W. GRATIAN

BY Philip S. Schmidt
HIS AGENT

Dec. 14, 1954 J. W. GRATIAN 2,697,135

MAGNETIC RECORDING HEAD

Filed Jan. 11, 1954 2 Sheets-Sheet 2

United States Patent Office 2,697,135
Patented Dec. 14, 1954

2,697,135

MAGNETIC RECORDING HEAD

Joseph W. Gratian, Rochester, N. Y., assignor to Stromberg-Carlson Company, a corporation of New York Application January 11, 1954, Serial No. 403,130

7 Claims. (Cl. 179—100.2)

My invention relates to magnetic recording apparatus, and more particularly to an improved head adapted for operations in magnetic recording.

As is well known to those skilled in the magnetic recording art, conventional magnetic recording heads, particularly those of the playback type, exhibit a hump, or rise, in low-frequency response, compared to the middle- and high-frequency range, before the response drops to zero. This amplitude variation may be minimized by compensating networks of electrical components, but practical networks introduce undesired phase shifts. Phase shifts may not be particularly disturbing in audio work, such as that involving speech or music, but may be most important in certain measurement fields such as telemetering and the like.

It is accordingly an object of my invention to provide an improved head for magnetic recording operations in which the characteristic response rise with increasing recorded wavelength is reduced.

It is also an object of my invention to provide a head adapted for magnetic recording operations in which the low frequency response is somewhat extended while at the same reducing pronounced portions of the low-frequency response curve.

In general, I accomplish these and other objects of my invention by providing magnetic means on the side of the magnetic medium opposite the side adjacent the head, this magnetic means being effective to shape the magnetic field in the region of the head.

Further objects and advantages of my invention will become apparent as the following description proceeds, and the features of novelty which characterize my invention will be pointed out with particularity in the claims annexed to and forming a part of this specification.

For a better understanding of my invention, reference may be had to the accompanying drawing in which.

I have chosen to explain my invention as applied to a cathode-ray tube type of magnetic recording reproducing head. This type of reproducing head is explained, for example, in my copending application Serial Number 335,502, filed February 6, 1953, and assigned to the same assignee as the present invention.

Figures 1, 2, 3, 4:
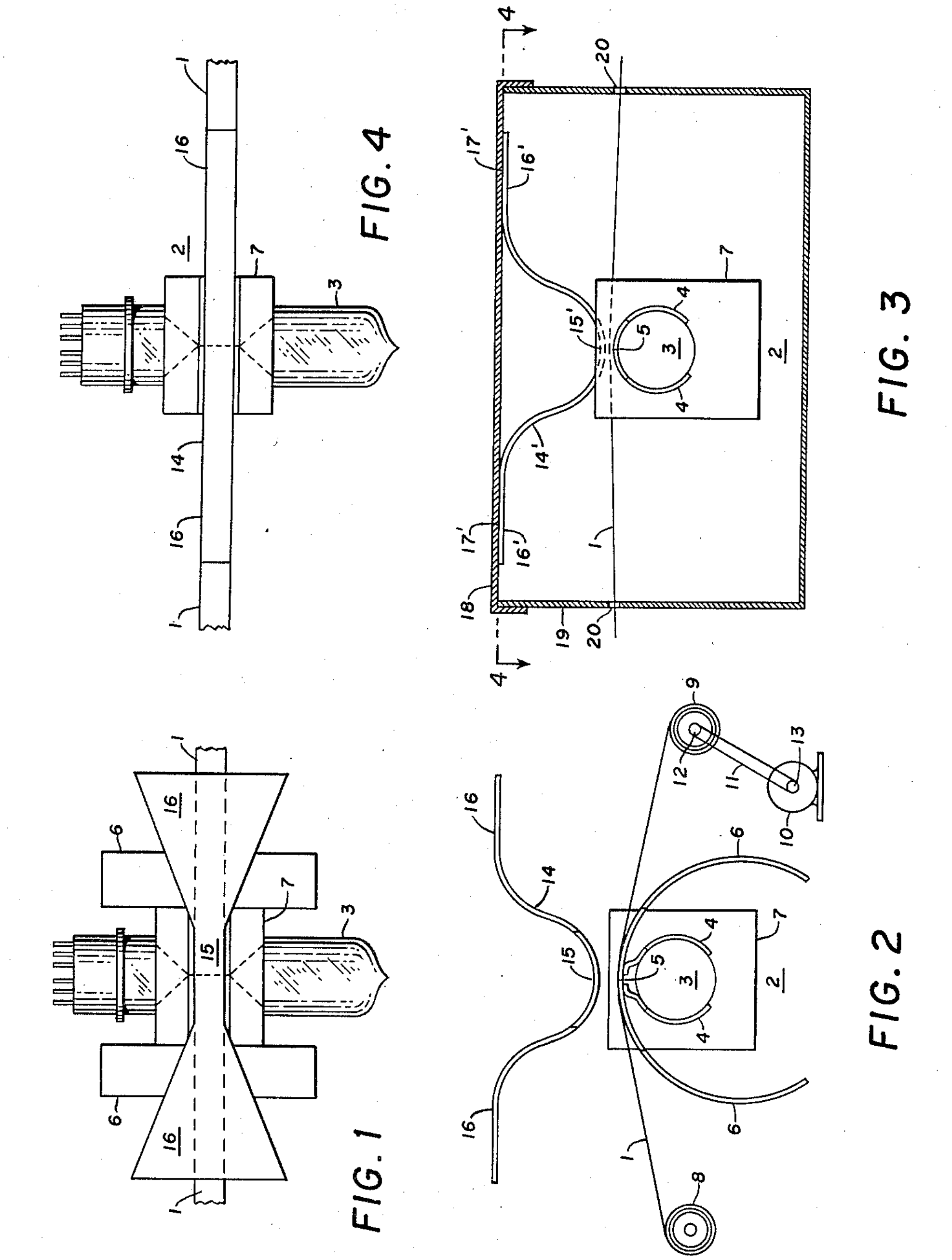
Fig. 1 is a top view of one embodiment of my invention.
Fig. 2 is an elevational view of the embodiment of Fig. 1.
Fig. 3 is an elevational view of a second embodiment of my invention.
Fig. 4 is a sectional view taken along line 4—4 of Fig. 3.

The embodiment of my invention shown in Figs. 1 and 2 includes a longitudinal magnetic recording medium 1 such as magnetic recording tape. The reproducing head, indicated generally by 2, includes a cathode ray tube 3, a core structure 4 which has an airgap 5 and may be additionally provided with wing members 6 to improve low-frequency response. Details of the latter arrangement are disclosed in the above-identified copending application. As is also explained in the above-identified copending application, a mass 7 of plastic may be used to hold the core 4 and wing members 6 in suitable positions relative to one another.

There are also provided means for transporting medium 1 past airgap 5. Such means may consist, for example, of storage reel 8 from which medium 1 is unwound onto take-up reel 9 by motor 10 driving reel 9 through the medium of belt 11 passing over pulleys 12 and 13.

In accordance with my invention, I provide magnetic means for shaping the field in the region of the head, this magnetic means being located on the side of the medium 1 opposite the side adjacent to which head 2 is located. In the embodiment of Figs. 1 and 2, this magnetic means may comprise a strap member 14 of generally U-shaped configuration, the bottom 15 of the U shape being placed in the region of airgap 5 but on the side of medium 1 opposite from airgap 5. The upper ends of the U-shaped portion I prefer to extend generally in the longitudinal direction of medium 1, and I further prefer that the midsection of the magnetic means be relatively narrow in the region adjacent airgap 5 and be of substantially greater width in portions 16 away from airgap 5. I have illustrated the upper portions of the U as extending horizontally in the longitudinal direction of the medium, although those skilled in the art can readily appreciate that other attitudes of portions 16 may be employed, thereby obtaining various modifications of the response curve.

Suitable support means may be provided for magnetic means 14; since the nature of such support means forms no part of my invention and since many types of such means may readily be arranged by those skilled in the art, it has been deemed unnecessary to complicate the drawing by a showing thereof.

A second embodiment of my invention is shown in Figs. 3 and 4. Here there are also provided a cathode-ray pickup tube 3 and a head 2 in which members 4 defining airgap 5 are embedded in a mass of plastic 7. Medium 1 is shown in position for reproduction relative to head 2, and it is to be understood that suitable means are provided for transporting the medium past the head. The transporting means may be similar to the arrangement shown in Figs. 1 and 2.

There is also provided magnetic means 14′ for shaping the field in the region of the head, this means being located on the side of medium 1 opposite the side on which head 2 is located. Magnetic means 14′ preferably is of strap shape having greater length than width, with the longer dimension thereof parallel to the direction of transport of medium 1. This strap shape is preferably formed into a generally U-shaped configuration with the bottom of the U shape being placed in the region of the airgap opposite the side of the medium 1 which passes over head 2. The upper ends 16′ of the U preferably extend horizontally in the direction of travel of medium 1, and the upper sides 17′ of portion 16′ preferably contact the under side of a lid 18 of shielding means 19. Shielding means 19 may be a box-like structure constructed of suitable magnetic shielding material such as an alloy of 75% nickel, 2% chromium, 5% copper, and 18% iron, known commercially as Mu-metal. Windows 20 may be cut in shielding means 19 to allow medium 1 to pass therethrough so that the transporting means for medium 1 may be located magnetically remote form head 2. I prefer that magnetic means 14′ be of substantially uniform width throughout, this arrangement being apparent from Fig. 4. The latter figure shows a sectional view of Fig. 3 taken along line 4—4.

Figure 5:
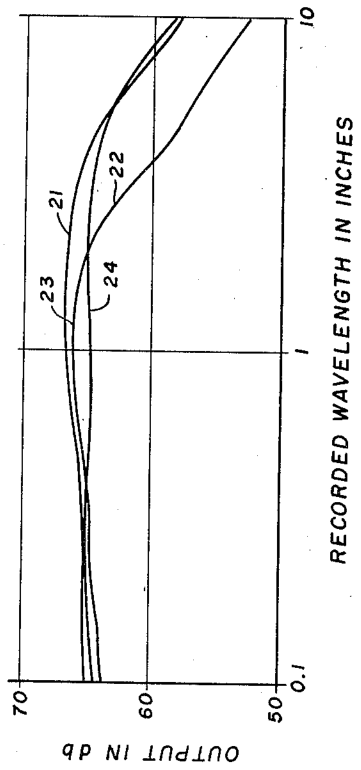
Fig. 5 is a frequency response characteristic achieved with the embodiment of Fig. 1.
Figure 6:
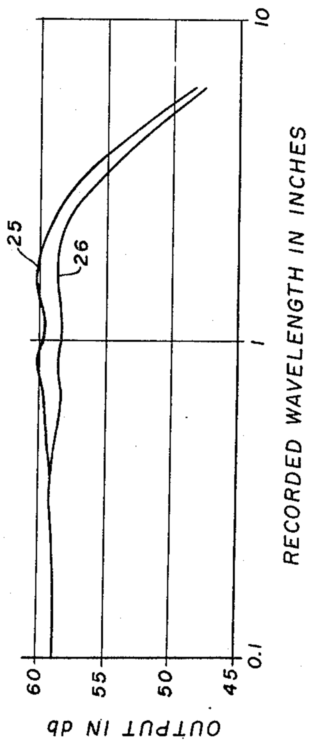
Fig. 6 is a frequency response characteristic achieved with the embodiment of Fig. 3.

The benefits conferred by the embodiment of Figs. 1 and 2 on one hand and the embodiment of Figs. 3 and 4 on the other are respectively illustrated in Figs. 5 and 6. Here the output level in *db* is plotted as a function of the recorded wavelength in inches. If, in the embodiment of Fig. 1, a plane flat plate of magnetic material is substituted for magnetic means 14, curve 21 is obtained when the plate is located 1″ away from medium 1 in the region of airgap 5. Upon bringing the plate within 0.01″ of medium 1, curve 22 is obtained. It will be observed that the use of a flat plate does not obviate the rise of response at long recorded wavelengths as evidenced by curve 21; and that the use of a flat plate in close proximity to medium 1 markedly impairs the response at longer wavelengths but does not remove the characteristic emphasis of low-frequency response, such as that at 23. The use of a magnetic means such as magnetic means 14 shown in Figs. 1 and 2, however, produces a nearly level response curve, as shown by 24 in Fig. 5, when portion 15 is located only 0.15" above medium 1. It is therefore apparent that the improvement is due to the shape of magnetic means 14 and not only to the proximity of metal.

Fig. 6 illustrates in similar fashion the benefits of the embodiment of Figs. 3 and 4. Here, curve 25 shows the response obtained with a shield 3" long and without any magnetic means 14' in place. Curve 26, on the other hand, shows the improved uniformity of response obtained when magnetic means, such as 14 in Fig. 3, is placed within the shield in the position shown. Those skilled in the art can readily appreciate that the reduced low-frequency response achieves more uniform response than customarily obtained without introduction of phase shifts.

Figure 7:
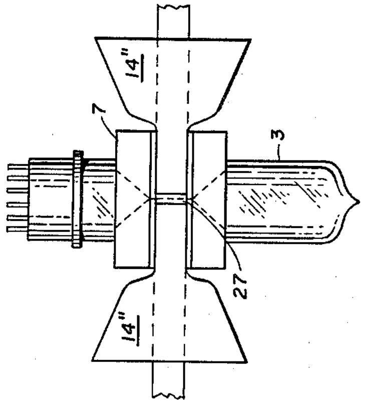
Fig. 7 is a top view of another embodiment of my invention.
Figure 8:
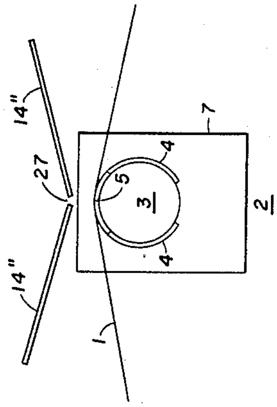
Fig. 8 is an elevational view of the embodiment of Fig. 7.

There is shown in Figs. 7 and 8 a third embodiment of my invention. As before, the head is indicated generally at 2, core members 4 being held in position relative to each other by suitable means, such as embedment in a mass of plastic 7, to define an airgap 5 therebetween. Medium 1 is arranged, as by the arrangement of Fig. 1, to pass over airgap 5.

In the example of Figs. 7 and 8, magnetic means 14" includes a high-reluctance means such as an airgap 27 in the central portion thereof. The width dimension of airgap 27 is perpendicular to the direction of travel of medium 1. Although the embodiment of Figs. 7 and 8 is illustrated as being more V-shaped than U-shaped, those skilled in the art can readily appreciate that numerous modifications of shapes and attitudes of magnetic means 14" may be employed in accordance with my invention, depending upon the exact shape of the response curve desired.

While I have shown and described my invention as applied to a specific embodiment thereof, other modifications will readily occur to those skilled in the art. I do not, therefore, desire my invention to be limited to the specific arrangement shown and described, and I intend in the appended claims to cover all modifications within the spirit and scope of my invention.

What I claim is:

1. In a magnetic recording apparatus, the combination of a longitudinal magnetic recording medium, a head adapted for operations in magnetic recording, said head including an airgap placed adjacent one side of said longitudinal magnetic recording medium, means for transporting said medium past said head, and magnetic means for shaping the field in the region of said head, said last-named means being located on the side of said magnetic recording medium opposite the side adjacent to which said head is located, and being of strap shape of greater length than width, with the longer dimension thereof parallel to the direction of transport of said meduim, said magnetic means having a central portion in the region of said airgap but adjacent the side of said magnetic recording medium opposite the side on which said head is located, said magnetic means having other portions extending generally in the direction of transport of said medium but diverging therefrom as distance from said central portion increases.

2. The combination of claim 1 in which said magnetic means is a strap member of generally U-shaped configuration, the bottom of said U-shape being placed in the region of said airgap on the side of said medium opposite the side of said medium passing over said head.

3. The combination of claim 2 in which the upper ends of said U have portions extending generally in the longitudinal direction of said medium.

4. The combination of claim 1 in which said magnetic means has a relatively narrow midsection in the region of said airgap and substantially greater width in the portions thereof away from said airgap.

5. The combination of claim 1 to which is added shielding means, said head and said magnetic means being enclosed in said shielding means, and said magnetic recording medium being arranged to pass through said shielding means, said other portions of said magnetic means being magnetically coupled to said shielding means.

6. The combination of claim 1 in which said central portion includes high reluctance means.

7. The combination of claim 6 in which said high reluctance means comprises an airgap having the width dimension thereof perpendicular to the direction of travel of said medium.

No references cited.